Dec. 12, 1939.  H. E. MUCHNIC  2,182,851
PISTON RING JOINT SEALING AND EXPANDING MEANS
Filed Aug. 27, 1937
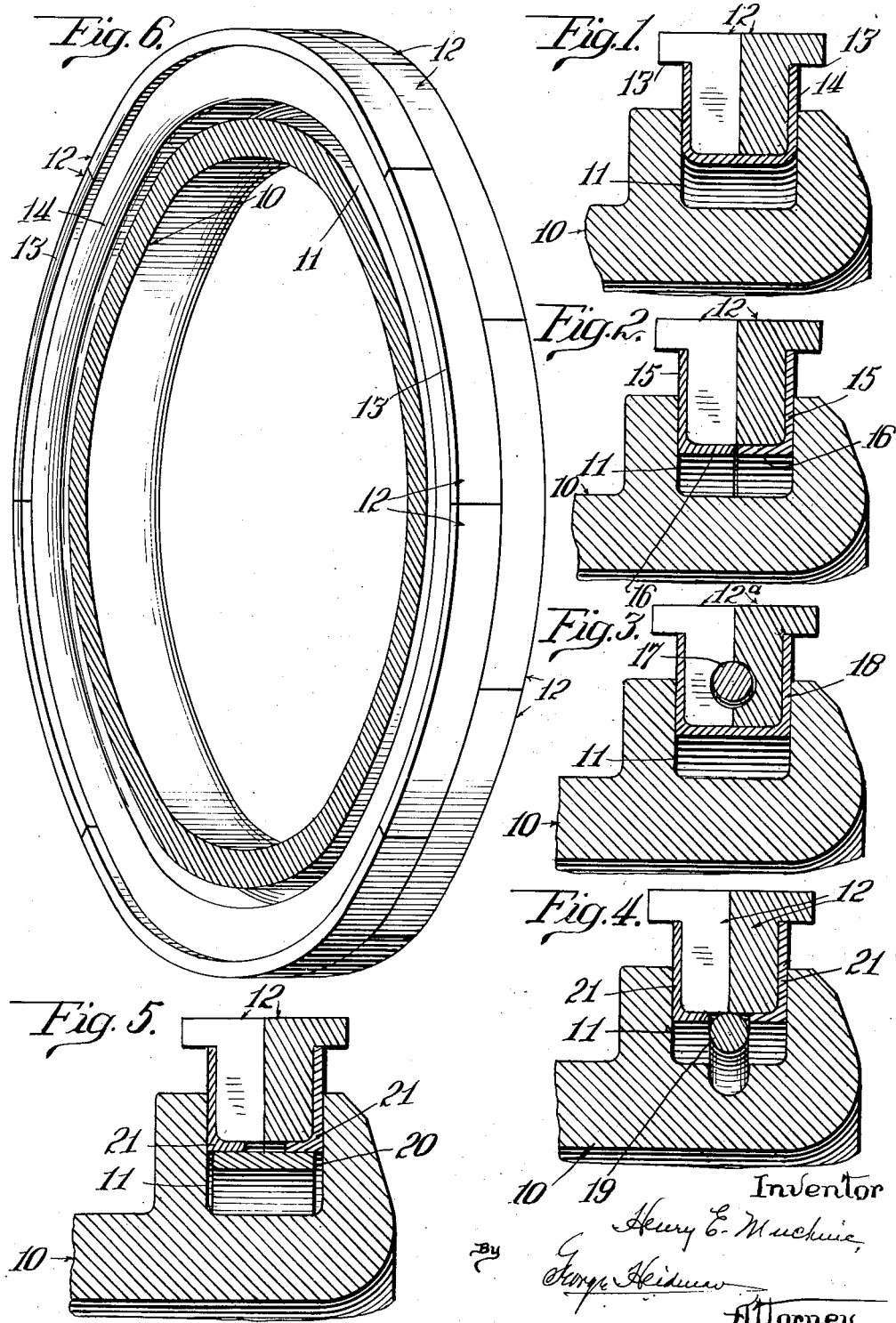
Inventor
Henry E. Muchnic,
George Heidman
By
Attorney

UNITED STATES PATENT OFFICE 2,182,851

PISTON RING JOINT SEALING AND EXPANDING MEANS

Henry E. Muchnic, Atchison, Kans., assignor to The Locomotive Finished Material Company, Atchison, Kans., a corporation of Kansas Application August 27, 1937, Serial No. 161,289

2 Claims. (Cl. 309—43)

My invention relates to means adapted to be interposed between the rings of the piston and the walls of the ring grooves and especially intended for use in connection with piston rings consisting of a plurality of segmental sections arranged in the same circumferential row and also in parallelly arranged circumferential rows as more especially employed in locomotive cylinders.

The invention as stated is intended for use in connection with sectional rings and has for its object the provision of means whereby the joints between the respective segmental sections will be sealed against steam passage transversely of the ring or rings; the seal means being adapted to move radially in keeping with such movement of the ring segments.

The invention also has for its object the provision of means of the character mentioned which may function as expander means for carrying the ring segments and maintaining them in close steam sealing contact with the walls of the cylinder during the reciprocatory movements of the piston.

The above enumerated objects and the advantages inherent in my invention will all be readily comprehended from the following detailed description of the accompanying drawing, wherein:

Figure 1 is a cross sectional view of a portion of the rim of a piston and of the ring, showing one form of my improved means applied.

Figure 2 is a similar view illustrating a modification of the means.

Figure 3 is a similar view illustrating the form of joint sealing means shown in Figure 1, with an expander ring arranged in a recess formed in the complementary sections of the piston ring.

Figure 4 is a similar sectional view showing a modification of the joint sealing means in conjunction with an expanding ring arranged beneath the sealing means.

Figure 5 is a similar view illustrating the type of joint sealing means disclosed in Figure 4 with a modified form of expanding ring therebeneath.

Figure 6 is a perspective view of a circumferential portion of a piston rim, illustrating the assembled ring sections and joint sealing means, with the piston rim broken away.

The invention relates to the type of piston ring composed of a plurality of segmental sections arranged in parallel and contacting circumferential rows in each ring receiving groove of the piston.

The respective sections of the ring are so mounted in the ring groove that they may be free to move radially and are usually maintained in rubbing contact with the cylinder wall by suitable resilient rings. The sections of one series or circumferential row are initially arranged so that the joints between the respective segmental sections of that row will break joint with those of the adjacent circumferential row. As the sections are intended to have free radial movement, it is possible for the sections of each row to shift or move circumferentially and thus cause the joints of one circumferential row to register with the joints of the adjacent row of segmental sections and thus afford the possibility of a steam leak.

The object of my invention is to provide means which will seal the respective joints between the segmental sections of the circumferential rows arranged in the same ring groove of the piston; such means, of necessity, being also adapted to have radial movement in the ring groove and, therefore, adapted to move with the ring sections. This means, in addition to functioning as joint sealing means, when desired may be made to act as the expanding means for yieldingly maintaining the ring sections in distended condition.

In Figure 1, I show a portion of the piston rim at 10, provided with a ring groove 11 in which the segmental ring sections 12 are mounted; the particular ring sections being shown with laterally extending lips 13 at the outer perimeters and on the sides disposed away from the sections in the adjacent row.

The segmental sections are shown mounted in the channel member 14 which is in the nature of a split resilient ring disposed circumferentially throughout the entire groove 11 in the piston as shown in Figure 6. This figure illustrates the manner of assembly of the segmental sections 12.

The channel member 14 is preferably of depth sufficient to lap the entire side of the body portion of the ring sections; that is to say, the channel member extends throughout the body of each section up to the lateral flange or lip as shown in Figures 1 and 6 and this member 14 is made resilient to also act as an expansion spring for yieldingly forcing the ring sections radially into engagement with the cylinder wall. The member 14 is therefore of circumferential dimensions greater than that of the bottom of the groove so as to normally assume the position shown in Figure 1; the spacing between the ends of the member 14, however, being such that the member with the assembled ring sections may be compressed to enable insertion of the assembly into the cylinder.

Instead of the member 14 being in a single unit, as shown in Figure 1, it may be split circumferentially into the two half sections 15, 15, generally of L-shape cross-section, as shown in Figure 2, with the bottoms 16 of each half preferably made substantially coextensive with the width of the ring sections 12. The two part means of Figure 2 consisting of two split rings of L-shape cross-section are intended to lap the outer side faces of the ring sections and are of circumferential dimensions somewhat greater than the circumferential dimensions of the bottom of the ring groove in the piston and these split rings 15, 15 are made resilient so as to normally force the piston ring sections radially outward into cylinder wall engaging position, while at the same time lapping the joints between the respective ring sections of each circumferential row and thus constitute sealing means against steam leaks.

Figure 3 illustrates the application of my improved joint sealing means to a type of piston ring of similar segmental sections as in the previously described exemplifications, except that the contacting side faces of the sections of adjacent rows are provided with complemental grooves to provide a recess adapted to receive the expansion spring 17 which tends to force the respective ring sections 12ª radially outward. In this assembly, the member 18, which is identical in construction with member 14 of Figure 1, need not be made to function as an expansion member but simply act as joint sealing means.

In Figures 4 and 5 I illustrate the application of my improved joint sealing means to the type of sectional piston rings having expansion springs located in the ring grooves beneath the ring sections; the expansion spring 19 in Figure 4 being substantially circular in cross-section, while the expansion spring 20 of Figure 5 is shown rectangular in cross-section. In these two exemplifications, the piston ring sections 12 are identical and are like those shown in Figure 1; and the joint sealing means in both cases are also similar. The joint sealing means in both instances consist of two complemental portions or annular half sections 21, 21 substantially L-shape in cross-section so as to lap the outer side faces of the main body portion of the ring sections and to extend therebeneath. The bottoms of the sections in this instance are shown somewhat shorter than those in Figure 2, thus allowing the expansion ring 19 to contact the bottoms of the piston ring sections.

Where separate expansion rings are employed, as in Figures 3, 4 and 5, the joint sealing members need not be made to function as expansion means if not desired.

In the various exemplifications the assembly of the respective elements will be as shown in Figure 6 with the members, either 14, 15, 18 or 21, in the form of split bands adapted to extend substantially throughout the ring grooves in the piston and to lap the entire sides of the body portions of the ring sections, all as shown in the respective figures.

What I claim is:

1. Means of the character described comprising, in combination with a piston provided with a ring receiving groove and a piston ring composed of complemental segmental sections arranged in parallel circumferential rows, a split annular channeled member formed to lap the sides and the bottoms of the segmental piston ring sections so as to seal the joints between the respective ring sections and to have expanding movement in the ring groove of the piston.

2. Means of the character described comprising, in combination with a piston the head whereof is circumferentially grooved; a piston ring composed of complemental segmental sections arranged in side to side circumferential rows; and an expansive split annular element of channel formation in cross-section extending circumferentially throughout the piston groove, adapted to slidingly fit into the ring receiving groove of the piston and being coextensive with the groove and to lap the sides and bottom of the sectional piston ring.

HENRY E. MUCHNIC.